May 8, 1928.

A. P. FILIPPI

MARINE AUTOMOBILE

Filed Dec. 15, 1925

1,669,000

Inventor:
A. P. Filippi,

Patented May 8, 1928.

1,669,000

UNITED STATES PATENT OFFICE.

ANTOINE PADOUE FILIPPI, OF PARIS, FRANCE.

MARINE AUTOMOBILE.

Application filed December 15, 1925, Serial No. 75,586, and in France December 23, 1924.

The present invention has for its subject a marine automobile constituting a new industrial product characterised by the application to a boat having screw propellers for driving, of propellers on vertical shafts rotating in the water and adapted to effect the raising of the hull.

In the accompanying drawing there is illustrated, solely by way of example, one form of construction of the invention.

Figure 1:
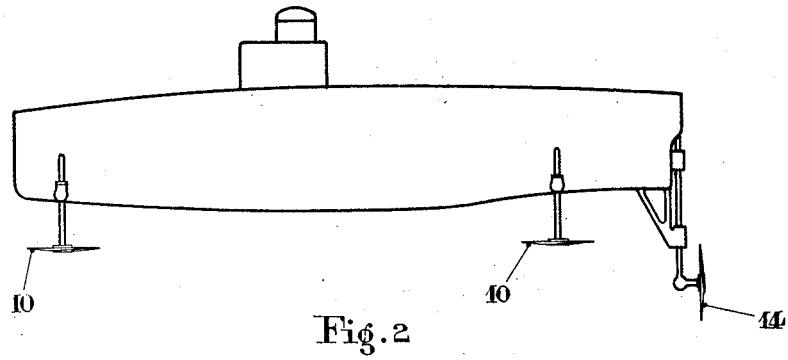
Fig. 1 is a view in longitudinal elevation of the device.
Figure 2:
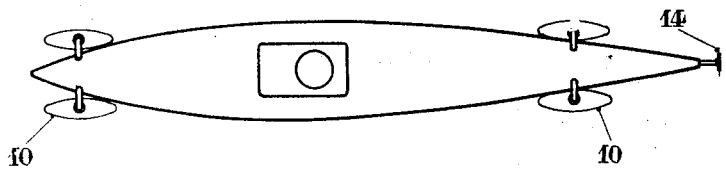
Fig. 2 is a plan view.
Figure 3:
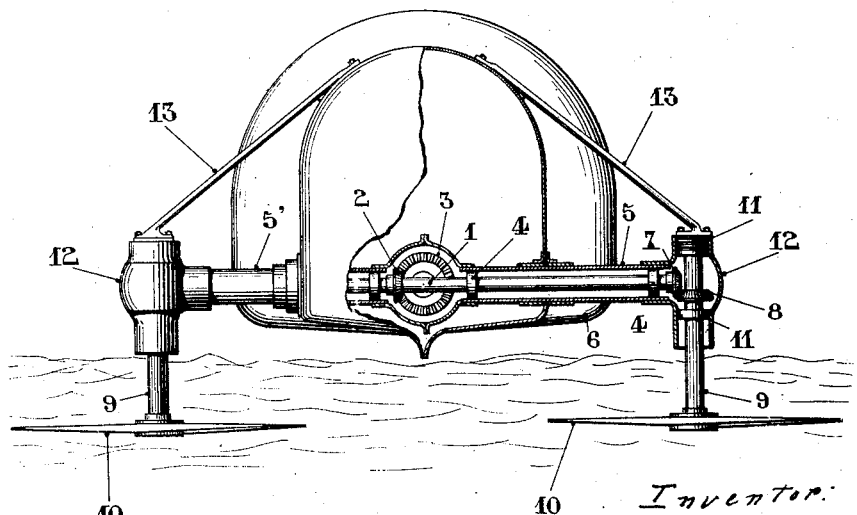
Fig. 3 is a front view of the automobile partly in section.

Each end of the machine is provided with a transverse shaft 1 to which is keyed a toothed pinion 2 gearing with a pinion 3 keyed to the end of the motor shaft. The shaft 1 rotates in bearings 4, 4 provided in the interior of tubes 5, 5' forming lateral projection on the outside of the hull 6. At each of the ends of the shaft 1 is keyed a bevel wheel 7 which drives, through the medium of a further bevel pinion 8, a vertical shaft 9 to the end of which is keyed a propeller 10, preferably of the type described in the applicant's French Patent Number 602,697, or of any other suitable type. The shaft 9 rotates in bearings 11 which are located in the interior of a casing 12 arranged and secured to the end of the corresponding tube 5. A strut 13 supports the casing and the outer extended portion of the tube 5. Packing glands, not illustrated, prevent the water from passing into the interior of the casing 12 and the tubes 5.

The immission and emission arrangement at the rear of the machine is similar to that described at the front.

The operation of the device is as follows.

When the motor is in operation it drives through the medium of the pinions 2 and 3, the shaft 1 of which the movement is transmitted to the propellers 10 by means of the gears 7 and 8. The rotation, in the water, of the propellers 10 determines the draft of the automobile of which the movement in the longitudinal direction is produced by a submerged screw 14 which may receive power from the motor which drives the propellers 10 or from a separate source. The resistance opposed by the water to the forward movement is considerably reduced because it is solely exerted upon the shafts 9 of circular section and on the propellers, which by rotation give rise to semi-lenticular volumes of which the curved surface is produced by the shape of the outline of the propeller.

By reason of the determination of the draft produced by the propellers and which may be varied as desired, the propellers rotate at a depth which can be adjusted as small as possible, and consequently the horizontal reaction of the water may be reduced to a negligible quantity.

It will be understood that the invention is not in any way limited to the method of construction illustrated and that this is capable of being modified in detail without departing from the scope of the invention. For example the number of draft determining propellers may be increased although only four are shown in the example illustrated. These propellers may be driven by one or more motors different from the one which drives the screw.

Moreover in an automobile of large tonnage provided with vertical shafts of large diameter these shafts may be provided with a casing having the shape of a solid of less resistance for the purpose of reducing the resistance of the water to forward movement.

It is also possible to use aerial helices, as in the known gliders, instead of a submerged screw.

Finally the draft determining propellers may be arranged in such a manner as to be capable of being raised and be located in wells provided for thus purpose in the hull. Movable guards may also be provided for protecting the propellers from shocks, the position of the propellers being substantially along the middle longitudinal plane.

It will be understood that the draft determining propellers, when submerged, provide a remarkable stability of the platform, whether the automobile is in movement or stationary, by reason of the resistance which they oppose to rolling and pitching. In the case of a choppy sea the automobile tends to pass across the waves. In this case it should also be provided with a hood of sharp shape similar to those used in submarines in such a manner that the hull and the hood will approach as much as possible a stream line shape of less resistance. The machine in such a case will act like a true submarine of which the submersion and semi-submersion will be ensured by the propellers 10 which will be rotated in opposite directions.

Having thus described my invention what I claim as new and desire to secure by Letters Patent is:—

1. A marine automobile comprising a hull of stream line shape, a plurality of tubes arranged in the sides of said hull and projecting laterally therefrom, a plurality of horizontal shafts, one of said shafts being mounted in each pair of oppositely disposed tubes, a plurality of casings mounted one at the end of each tube, vertical shafts mounted one in each of said casings, gearing between the vertical shafts and the horizontal shafts, and propellers mounted at the ends of said vertical shafts, and a propeller with means for driving the same for producing longitudinal movement of the automobile.

2. A marine automobile comprising a hull of stream line shape, a plurality of tubes arranged in the sides of said hull and projecting laterally therefrom, a plurality of horizontal shafts, one of said shafts being mounted in each pair of oppositely disposed tubes, a plurality of casings mounted one at the end of each tube, vertical shafts mounted one in each of said casings, gearing between the vertical shafts and the horizontal shafts, and propellers mounted at the ends of said vertical shafts, and a propeller with means for driving the same for producing longitudinal movement of the automobile, struts connected to said casings and to said hull.

3. A marine automobile comprising a hull of stream line shape, a plurality of tubes arranged in the sides of said hull and projecting laterally therefrom, a plurality of horizontal shafts, one of said shafts being mounted in each pair of oppositely disposed tubes, a plurality of casings mounted one at the end of each tube, vertical shafts mounted one in each of said casing, gearing between the vertical shafts and the horizontal shafts, and propellers mounted at the ends of said vertical shafts, and a propeller with means for driving the same for producing longitudinal movement of the automobile, and bearings in said tubes and said casings for the horizontal and vertical shafts.

ANTOINE PADOUE FILIPPI.